US012573695B2

(12) United States Patent
Ma et al.

(10) Patent No.: US 12,573,695 B2
(45) Date of Patent: Mar. 10, 2026

(54) ELECTROCHEMICAL DEVICE AND ELECTRICAL DEVICE

(71) Applicant: Ningde Amperex Technology Limited, Ningde (CN)

(72) Inventors: Wu Ma, Ningde (CN); Guowen Zhang, Ningde (CN); Ligang Zhou, Ningde (CN); Jun Jiang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 580 days.

(21) Appl. No.: 18/149,250

(22) Filed: Jan. 3, 2023

(65) Prior Publication Data

US 2023/0133112 A1 May 4, 2023

Related U.S. Application Data

(63) Continuation of application No. PCT/CN2020/099933, filed on Jul. 2, 2020.

(51) Int. Cl.
| | |
|---|---|
| *H01M 50/00* | (2021.01) |
| *H01M 50/119* | (2021.01) |
| *H01M 50/159* | (2021.01) |
| *H01M 50/169* | (2021.01) |
| *H01M 50/176* | (2021.01) |

(Continued)

(52) U.S. Cl.
CPC ....... *H01M 50/176* (2021.01); *H01M 50/119* (2021.01); *H01M 50/159* (2021.01); *H01M 50/169* (2021.01); *H01M 50/186* (2021.01); *H01M 50/193* (2021.01)

(58) Field of Classification Search
CPC ............. H01M 50/176; H01M 50/119; H01M 50/159; H01M 50/169; H01M 50/193; H01M 50/186
See application file for complete search history.

(56) References Cited

U.S. PATENT DOCUMENTS

| | | |
|---|---|---|
| 2008/0187828 A1 | 8/2008 | Oh et al. |
| 2015/0118554 A1 | 4/2015 | Wu et al. |

(Continued)

FOREIGN PATENT DOCUMENTS

| | | |
|---|---|---|
| CN | 102097651 A | 6/2011 |
| CN | 205992559 U | 3/2017 |
| CN | 108232050 A | 6/2018 |

(Continued)

OTHER PUBLICATIONS

Fukaya et al., Sheath Material for Battery, Feb. 2004, See thee Abstract. (Year: 2004).*

(Continued)

*Primary Examiner* — Tiffany Legette
*Assistant Examiner* — Monique M Wills
(74) *Attorney, Agent, or Firm* — Maier & Maier, PLLC

(57) ABSTRACT

An electrochemical device includes an electrode assembly and a housing for accommodating the electrode assembly. The housing includes a first housing body and a second housing body fixedly connected to the first housing body. A notch is provided on at least one of the first housing body or the second housing body. The electrode assembly includes a tab. The tab protrudes out of the housing from the notch. The notch is filled with a sealing material.

22 Claims, 13 Drawing Sheets

(51) Int. Cl.
 *H01M 50/186* (2021.01)
 *H01M 50/193* (2021.01)

(56) References Cited

U.S. PATENT DOCUMENTS

| | | | |
|---|---|---|---|
| 2015/0147633 A1 | 5/2015 | Ahn et al. | |
| 2020/0127323 A1* | 4/2020 | Juzkow ............... | H01M 10/653 |

FOREIGN PATENT DOCUMENTS

| | | |
|---|---|---|
| CN | 108780857 A | 11/2018 |
| CN | 209896115 U | 1/2020 |
| DE | 102014013401 A1 | 3/2016 |
| EP | 2333869 A1 | 6/2011 |
| EP | 3399569 A1 | 11/2018 |
| EP | 3648225 A2 | 5/2020 |
| JP | 2004052100 A * | 2/2004 |
| JP | 2006252802 A * | 9/2006 |
| KR | 20130086485 A | 8/2013 |
| KR | 20140016659 A | 2/2014 |
| WO | 2014165004 A1 | 10/2014 |

OTHER PUBLICATIONS

Chiba et al., Tab Lead for Nonaqueous Electrolyte Battery and Nonaqueous Electrolyte Battery, Sep. 2006, See thee Abstract. (Year: 2006).*
International Search report issued Apr. 8, 2021, in Corresponding International Patent Application No. PCT/CN2020/099933, 7 pages.
Supplementary Search Report issued on Aug. 10, 2023, in corresponding European Application No. EP 20 94 3166, 2 pages.
Office Action issued on May 24, 2024, in corresponding Chinese Application No. 202080102611.0, 12 pages.

\* cited by examiner

ELECTROCHEMICAL DEVICE AND ELECTRICAL DEVICE

CROSS-REFERENCE TO RELATED APPLICATION

This application is a continuation application of International Application No. PCT/CN2020/099933, filed on Jul. 2, 2020, the content of which is incorporated herein by reference in its entirety.

TECHNICAL FIELD

This application relates to an electrochemical device and an electrical device.

BACKGROUND

Electrochemical devices are rechargeable and dischargeable, and have been widely used in consumer products, digital products, power products, medical treatment, security protection, and other fields. A conventional process used to lead out an electrode in an existing electrochemical device is: making a through-hole on a sidewall of a housing first, and then disposing an electrode post in the through-hole, and sealing the through-hole with an insulating pad, where one end of the electrode post inside the housing is electrically connected to a tab, and the other end of the electrode post is located outside the housing and configured to be connected to an external electronic device. Such a sealing structure occupies a relatively large internal space of the electrochemical device, and results in a considerable loss of an energy density of the electrochemical device. In addition, the sealing structure is rather complicated, costly for processing, and of low reliability.

SUMMARY

This application aims to solve at least one of technical problems in the related art. For this purpose, one aspect of this application is to disclose an electrochemical device. A tab is led out through a notch provided on a housing of the electrochemical device, and the sealing is implemented by filling the notch with a sealing material. The sealing structure is simple and highly reliable.

The electrochemical device according to an embodiment of this application includes an electrode assembly and a housing for accommodating the electrode assembly. The housing includes a first housing body and a second housing body fixedly connected to the first housing body. A notch is provided on at least one of the first housing body or the second housing body. The electrode assembly includes a tab, and the tab protrudes out of the housing from the notch. The notch is filled with a sealing material.

In some embodiments, the sealing material includes an elastic sealing material or a binder.

In some embodiments, the binder includes any one of polypropylene hot-melt adhesive, phenolic resin adhesive, or epoxy adhesive.

In some embodiments, the elastic sealing material includes any one of polypropylene, polycarbonate, polyamide, polystyrene, fluororubber, or soluble polytetrafluoroethylene.

In some embodiments, the notch is not provided on the first housing body, but the notch is provided on the second housing body.

In some embodiments, the first housing body is a top cover of the housing, and the second housing body includes a sidewall and a bottom wall connected to the sidewall.

In some embodiments, a stepped portion is disposed on the sidewall, and the stepped portion is configured to hold the top cover.

In some embodiments, a first stepped portion is disposed on the sidewall. A second stepped portion corresponding to the first stepped portion is disposed on the top cover. The first housing body is connected to the second housing body by the first stepped portion and the second stepped portion to form the housing.

In some embodiments, a first notch is provided on the first housing body. A second notch corresponding to the first notch is provided on the second housing body. The first notch and the second notch together form the notch.

In some embodiments, the first housing body includes a first sidewall and a first bottom wall connected to the first sidewall. The second housing body includes a second sidewall and a second bottom wall connected to the second sidewall.

In some embodiments, a first stepped portion is disposed on the first sidewall. A second stepped portion corresponding to the first stepped portion is disposed on the second sidewall. The first housing body is connected to the second housing body by the first stepped portion and the second stepped portion to form the housing.

In some embodiments, the housing further includes a third housing body. The first housing body is a top cover of the housing. The second housing body is a sidewall of the housing. The third housing body is a bottom cover of the housing. The first housing body, the second housing body, and the third housing body are sequentially connected to form the housing.

In some embodiments, a wall of the notch and the sealing material are interspaced with a high-temperature protection material. The tab, the sealing material, and the high-temperature protection material form an m-layer structure in the notch, where an outermost layer of the structure is made of the high-temperature protection material, and m is a positive integer greater than or equal to 3 and less than or equal to 10.

In some embodiments, a melting point of the high-temperature protection material is greater than or equal to 300° C.

In some embodiments, the high-temperature protection material includes any one of a steel alloy, an aluminum alloy, an iron alloy, a copper alloy, a liquid crystal polymer, p-hydroxybenzaldehyde, polyethylene terephthalate, polyvinyl chloride, polyimide, poly(acrylonitrile-co-butadiene-co-styrene), polycarbonate, polyamide, or polystyrene.

In some embodiments, the first housing body and the second housing body are fixedly connected in a vertical direction or a horizontal direction.

In some embodiments, the first housing body and the second housing body are fixedly connected together by at least one of gluing, heat sealing, or welding.

In some embodiments, both the first housing body and the second housing body are made of a material that includes any one of a steel alloy, an aluminum alloy, an iron alloy, a copper alloy, a liquid crystal polymer, p-hydroxybenzaldehyde, polyethylene terephthalate, polyvinyl chloride, polyimide, poly(acrylonitrile-co-butadiene-co-styrene), polycarbonate, or polyamide.

In some embodiments, the electrode assembly includes two tabs, and the two tabs protrude out of the housing from the notch.

In some embodiments, the electrode assembly includes a positive electrode plate, a negative electrode plate, a separator, and two tabs. The separator is disposed between the positive electrode plate and the negative electrode plate. The two tabs are electrically connected to a positive current collector of the positive electrode plate and a negative current collector of the negative electrode plate respectively.

In some embodiments, the two tabs protrude from a same side of the housing, or the two tabs protrude from different sides of the housing.

In some embodiments, the notch is in a rectangular shape.

In some embodiments, a boss is disposed on one wall of the notch or the sealing material, a dent is disposed on an other wall of the notch or the sealing material. The boss is snap-fitted to the dent.

The stepped portion, the first stepped portion, and the second stepped portion are all L-shaped.

Another aspect of this application discloses an electrical device. The electrical device includes the electrochemical device. The electrochemical device includes an electrode assembly and a housing for accommodating the electrode assembly. The housing includes a first housing body and a second housing body fixedly connected to the first housing body. A notch is provided on at least one of the first housing body or the second housing body. The electrode assembly includes a tab. The tab protrudes out of the housing from the notch. The notch is filled with a sealing material.

In the electrochemical device according to some embodiments of this application, the tab is led out through the notch provided on the housing of the electrochemical device, and the sealing is implemented by filling the notch with the sealing material. The sealing structure is simple and highly reliable, and this sealing method is space-efficient, and increases the energy density of the electrochemical device.

BRIEF DESCRIPTION OF DRAWINGS

The above and/or additional aspects and advantages of this application will become evident and easily comprehensible through the description of some embodiments with reference to the drawings outlined below.

Figure 1:
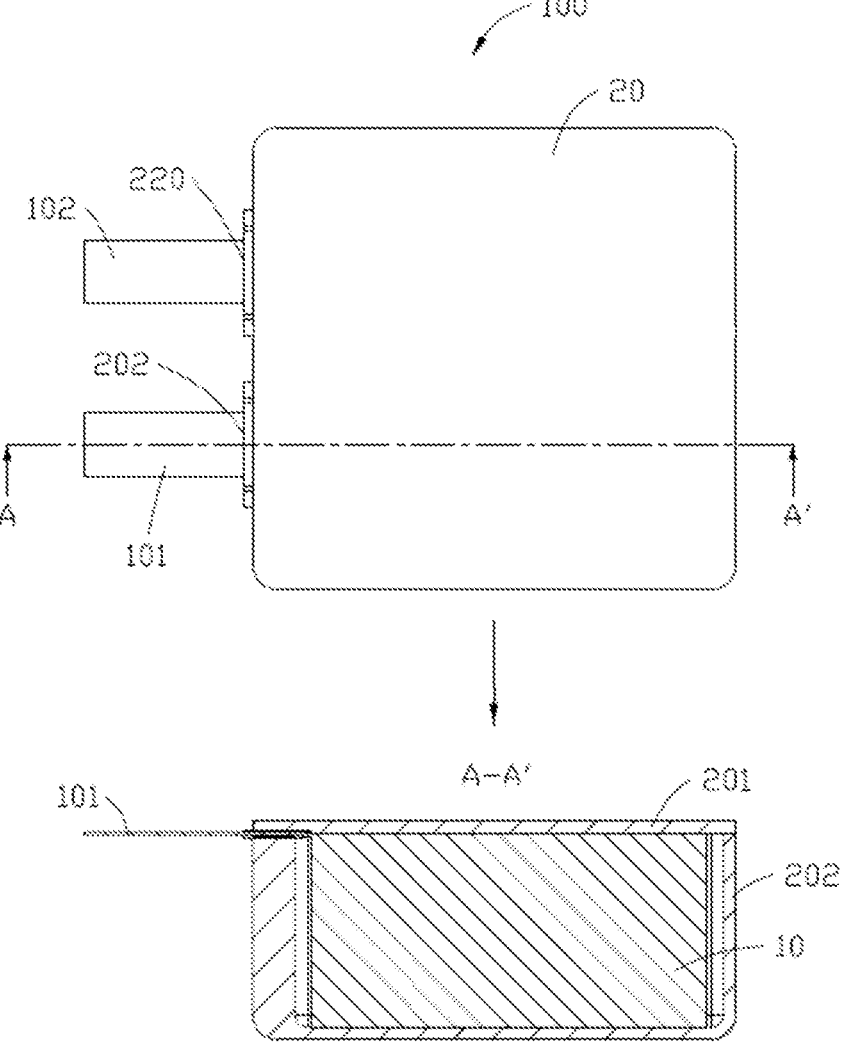
FIG. 1 is a schematic structural diagram of an electrochemical device according to an embodiment of this application.

Reference numerals of main components:

electrode assembly 10, housing 20, sealing material 30, high-temperature protection material 40, electrochemical device 100, positive tab 101, negative tab 102, positive electrode plate 103, negative electrode plate 104, separator 105, first housing body 201, second housing body 202, notch 220, electrical device 200, sidewall 2020, bottom wall 2022, first sidewall 2010, first bottom wall 2012, second sidewall 2024, second bottom wall 2026, dent 2201, boss 2203.

DETAILED DESCRIPTION

The following describes some embodiments of this application in detail. Examples of the embodiments are shown in the drawings, throughout which the same or similar reference numerals represent the same or similar components or the components of the same or similar functions. The embodiments described below with reference to the drawings are illustrative, and are merely intended to construe this application but not to limit this application.

The following describes in detail an electrochemical device 100 according to an embodiment of this application with reference to FIG. 1 to FIG. 17.

Figure 2:
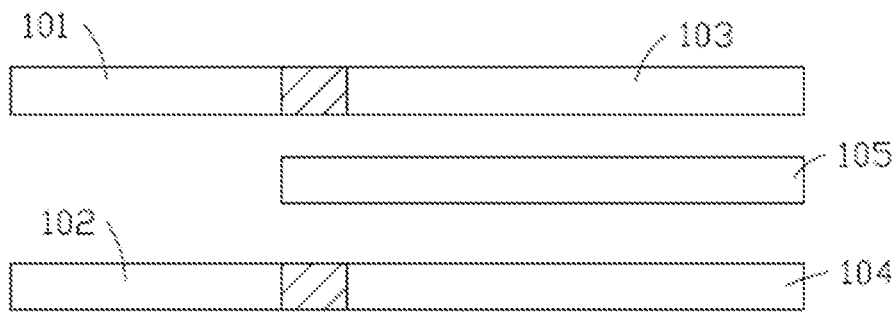
FIG. 2 is a schematic structural diagram of an electrode assembly according to an embodiment of this application.
Figure 3:
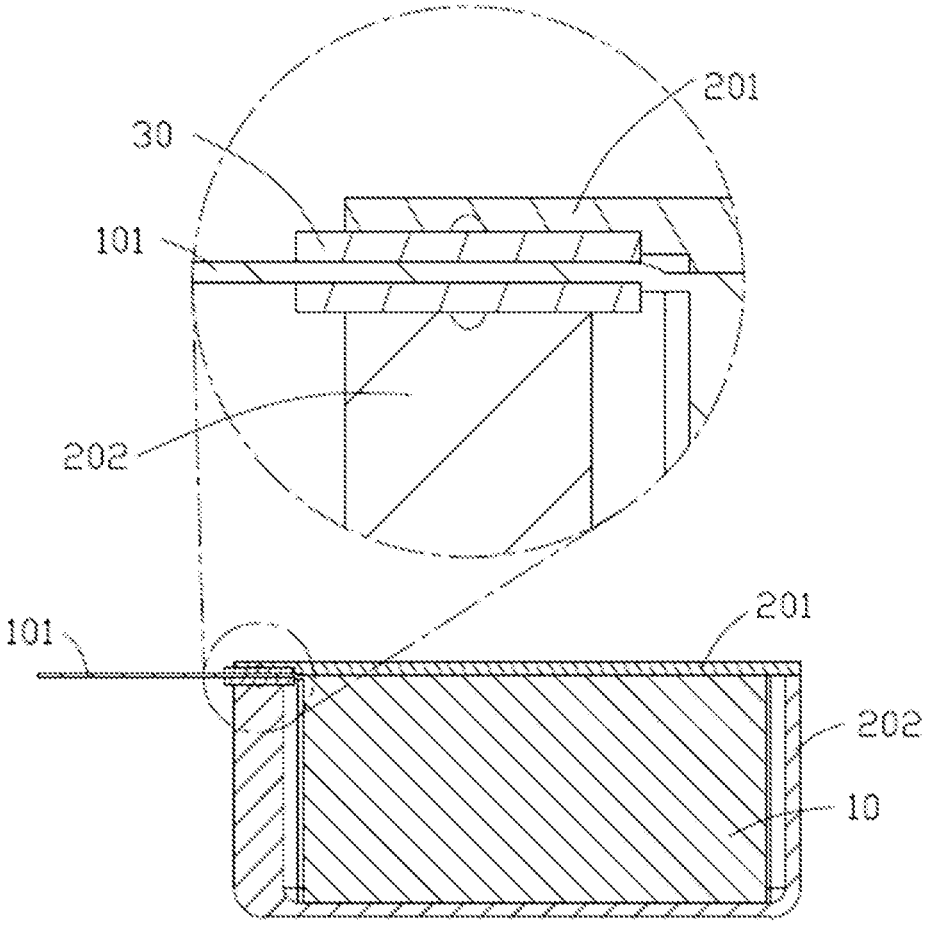
FIG. 3 is a close-up view of a notch filled with a sealing material according to an embodiment of this application.

As shown in FIG. 1 to FIG. 3, the electrochemical device 100 according to an embodiment of this application includes an electrode assembly 10 and a housing 20. The electrode assembly 10 is accommodated in the housing 20. As shown in FIG. 2, the electrode assembly 10 may include a positive tab 101, a positive tab 102, a positive electrode plate 103, a negative electrode plate 104, and a separator 105. The separator 105 is disposed between the positive electrode plate 103 and the negative electrode plate 104. The positive tab 101 is electrically connected to the positive current collector of the positive electrode plate 103. The negative tab 102 is electrically connected to the negative current collector of the negative electrode plate 104. The electrode assembly may be a jelly-roll electrode assembly formed by winding the positive electrode plate 103, the negative electrode plate 104, and the separator 105, or a stacked-type electrode assembly formed by stacking the positive electrode plate 103, the negative electrode plate 104, and the separator 105.

The positive tab 101 and the negative tab 102 may be made of an electrolyte-resistant conductive material such as a steel alloy, an aluminum alloy, an iron alloy, a copper alloy, or a nickel alloy. The positive current collector of the positive electrode plate 103 is an aluminum foil, and the negative current collector of the negative electrode plate 104 is a copper foil.

In some embodiments, the positive tab 101 is electrically connected to the positive current collector of the positive electrode plate 103 by welding or by other connection means (such as conductive adhesive tape). Alternatively, the positive tab 101 may be directly formed by cutting the positive current collector of the positive electrode plate 103. The negative tab 102 is electrically connected to the negative current collector of the negative electrode plate 104 by welding or by other connection means (such as conductive adhesive tape). Alternatively, the negative tab 102 may be directly formed by cutting the negative current collector of the negative electrode plate 104.

In some embodiments, as shown in FIG. 1, the housing 20 includes a first housing body 201 and a second housing body 202. A notch 220 is disposed on at least one of the first housing body 201 or the second housing body 202. To be specific, the notch 220 may be disposed on the first housing body 201 alone, the notch 220 may be disposed on the second housing body 202 alone, and the notch 220 may be disposed on both the first housing body 201 and the second housing body 202 (this configuration may be: a first semi-notch is disposed on the first housing body 201, a second semi-notch is disposed on the second housing body 202, and the first semi-notch and the second semi-notch combine to form the notch 220).

In some embodiments, as shown in FIG. 1, the positive tab 101 and the negative tab 102 may protrude out of the housing 20 through separate notches 220. In other embodiments, the positive tab 101 and the negative tab 102 may protrude out of the housing 20 through the same notch 220. To be specific, when the positive tab 101 and the negative tab 102 protrude out of the housing 20 through the same notch 220, only one notch 220 needs to be disposed on the housing 20. When the positive tab 101 and the negative tab 102 protrude out of the housing 20 through separate notches 220, two notches 220 need to be disposed on the housing 20. To isolate a cavity of the housing 20 from an outer surface of the housing 20 and ensure electrochemical stability of the electrode assembly 10 in the housing 20, the notch 220 is filled with a sealing material 30.

In some embodiments, the sealing material 30 may be an elastic sealing material or a binder. The elastic sealing material optionally possesses the following properties: resistance to electrolyte corrosion, favorable resistance to media corrosion, oxidation resistance, aging resistance, high-temperature resistance, high inherent packing density of the material, low air permeability, favorable insulation effects, material compressibility, and favorable mechanical properties and processing properties. The elastic sealing material may be any one selected from polypropylene, polycarbonate, polyamide, polystyrene, fluororubber, and soluble polytetrafluoroethylene. The binder optionally possesses the following properties: resistance to electrolyte corrosion, oxidation resistance, aging resistance, favorable performance of bonding to metal or plastic, favorable water-proof performance, high inherent packing density of the binder, favorable insulation effects, and favorable high-temperature resistance. The binder may be any one selected from polypropylene hot-melt adhesive, phenolic resin adhesive, or epoxy adhesive.

Figure 4A:
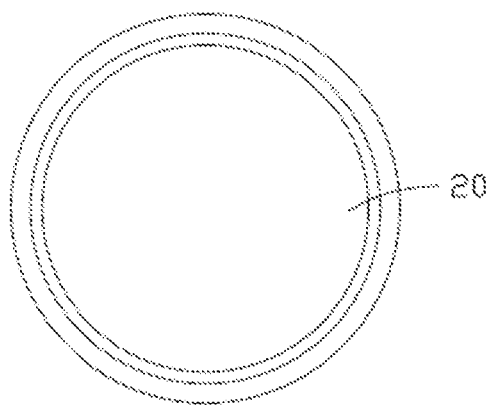
FIG. 4A, FIG. 4B and FIG. 4C are schematic structural diagrams of a cross section of a housing according to an embodiment of this application.
Figure 4B:
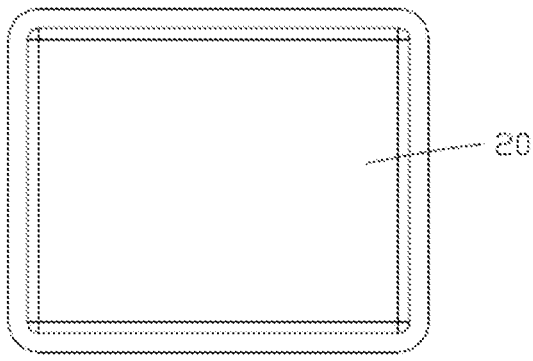
Figure 4C:
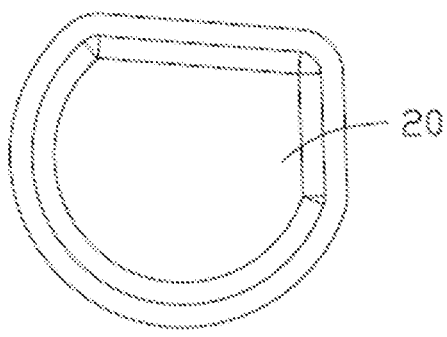

In some embodiments, the first housing body 201 and the second housing body 202 may be prepared by injection molding, machining, stamping, or other processing methods. The dimensions of the first housing body 201 and the second housing body 202 may be set according to the actual design requirements of the electrochemical device 100, without being limited herein. Both the first housing body 201 and the second housing body 202 are optionally made of an electrolyte-resistant material that may be any one selected from a steel alloy, an aluminum alloy, an iron alloy, a copper alloy, a liquid crystal polymer, p-hydroxybenzaldehyde, polyethylene terephthalate, polyvinyl chloride, polyimide, poly (acrylonitrile-co-butadiene-co-styrene), polycarbonate, and polyamide. Optionally, the cross-sectional shape of the first housing body 201 is the same as the cross-sectional shape of the second housing body 202. The cross-sectional shape of both the first housing body 201 and the second housing body 202 may be circular, quadrilateral, arc-shaped, elliptical, triangular, polygonal (with more than four sides), irregular, or the like. FIG. 4A shows a cross-sectional shape of the housing 20 as circular. FIG. 4B shows a cross-sectional shape of the housing 20 as rectangular. FIG. 4C shows a cross-sectional shape of the housing 20 as irregular.

In some embodiments, the first housing body 201 and the second housing body 202 may be connected as a whole by gluing, heat sealing, welding, or other processing techniques to form the housing 20. If the sealing material 30 is an elastic sealing material, during processing of the first housing body 201 and the second housing body 202 to form a whole, the elastic sealing material in the notch 220 may be tightly compressed (at a compression ratio of 10% to 40%). The compressed elastic sealing material may fully fill the notch 220. In this way, the first housing body 201, the second housing body 202, and the tabs and the elastic sealing material in the notch 220 form a sealing structure. If the sealing material 30 is a binder, during processing of the first housing body 201 and the second housing body 202 to form a whole, the binder may fill the notch 220. In this way, the first housing body 201, the second housing body 202, and the tabs and the binder in the notch 220 form a sealing structure of the electrochemical device 100.

In some embodiments, the housing 20 may be formed by assembling three or more housing parts. For example, the housing 20 includes a first housing body, a second housing body, and a third housing body that are stand-alone. The first housing body is a top cover of the housing 20, the second housing body is a sidewall of the housing 20, and the third housing body is a bottom cover of the housing 20. The first housing body, the second housing body, and the third housing body are sequentially connected to form the housing 20. As another example, the housing 20 includes a first housing body, a second housing body, a third housing body, and a fourth housing that are stand-alone. The first housing body is a top cover of the housing 20, the second housing body is a first sidewall of the housing 20, the third housing body is a second sidewall of the housing 20, and the fourth housing is a bottom cover of the housing 20. The first housing body, the second housing body, the third housing body, and the fourth housing are sequentially connected to form the housing 20.

In the electrochemical device 100 according to this embodiment of this application, the tab is led out through the notch provided on the housing, and the notch is filled with the sealing material. The sealing structure is simple and highly reliable, and occupies little space in the housing, thereby increasing the energy density of the electrochemical device.

Figure 5A:
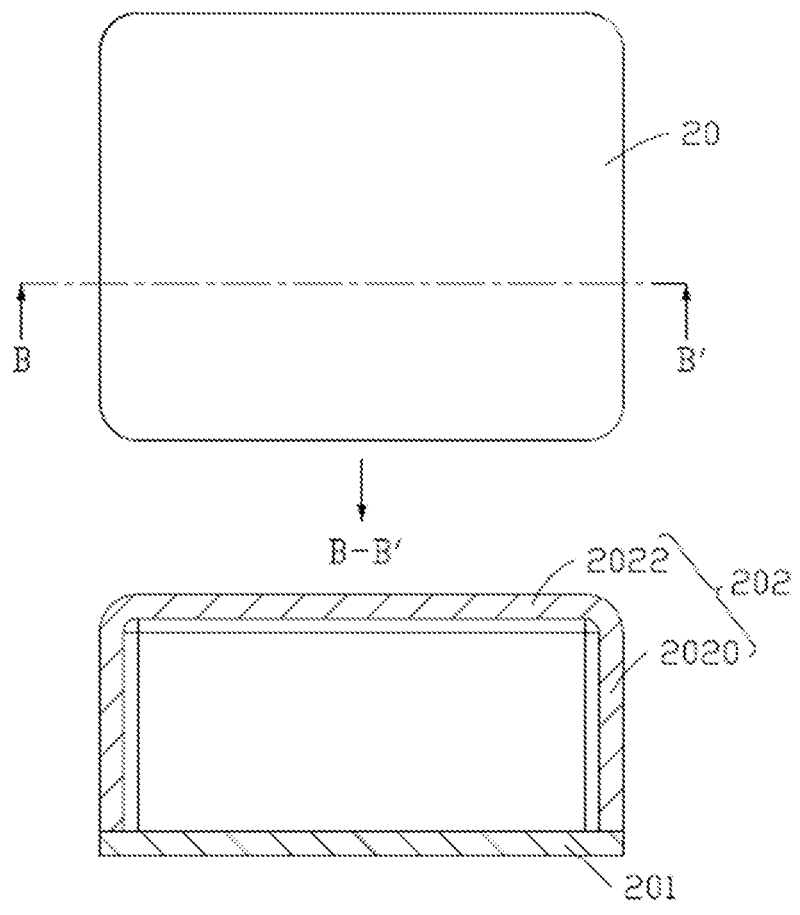
FIG. 5A is a schematic structural diagram of vertical connection between a first housing body and a second housing body according to an embodiment of this application.
Figure 5B:
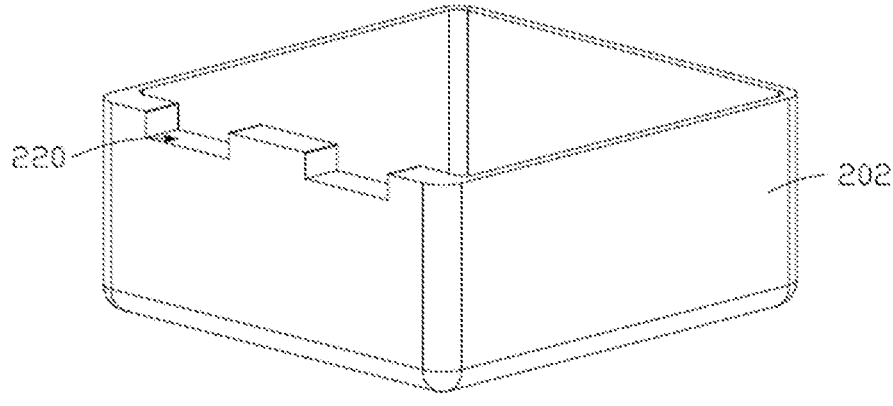
FIG. 5B is a schematic structural diagram of a notch provided on a sidewall of a second housing body according to an embodiment of this application.

As shown in FIG. 5A, the housing 20 includes a first housing body 201 and a second housing body 202. The first housing body 201 is a top cover of the housing 20, and the second housing body 202 includes a sidewall 2020 and a bottom wall 2022 connected to the sidewall 2020. The sidewall 2020 may be a circular sidewall, a quadrangular sidewall, a polygonal sidewall (with more than four sides), an irregular sidewall, or the like. As shown in FIG. 5B, the notch 220 is provided on the second housing body 202. The shape of the notch 220 may be a rectangle. Because the first housing body 201 is a top cover, no notch is provided on the first housing body 201. The positive tab 101 protrudes out of the housing 20 from the notch 220, and the sealing material 30 (such as fluororubber) is disposed in the notch 220. The first housing body 201 and the second housing body 202 are connected in a vertical direction, and a contact face between the first housing body 201 and the second housing body 202 is a plane.

A process of assembling the housing may be: fixing the second housing body 202 onto a workbench jig first, and then placing the first housing body 201 on the second housing body 202, and exerting an external pressure on the first housing body 201 so that the first housing body 201 fits the second housing body 202 closely; and subsequently, connecting the first housing body 201 and the second housing body 202 to form a whole by gluing, heat sealing, welding, or one or more thereof. At the same time, the fluororubber at the notch 220 is compressed tightly (at a compression ratio of 10% of 40%). The compressed fluororubber may fully fill the notch 220, thereby isolating the cavity of the housing 20 from the outer surface of the housing 20 and ensuring electrochemical stability of the electrode assembly 10 in the housing 20.

Figure 6:
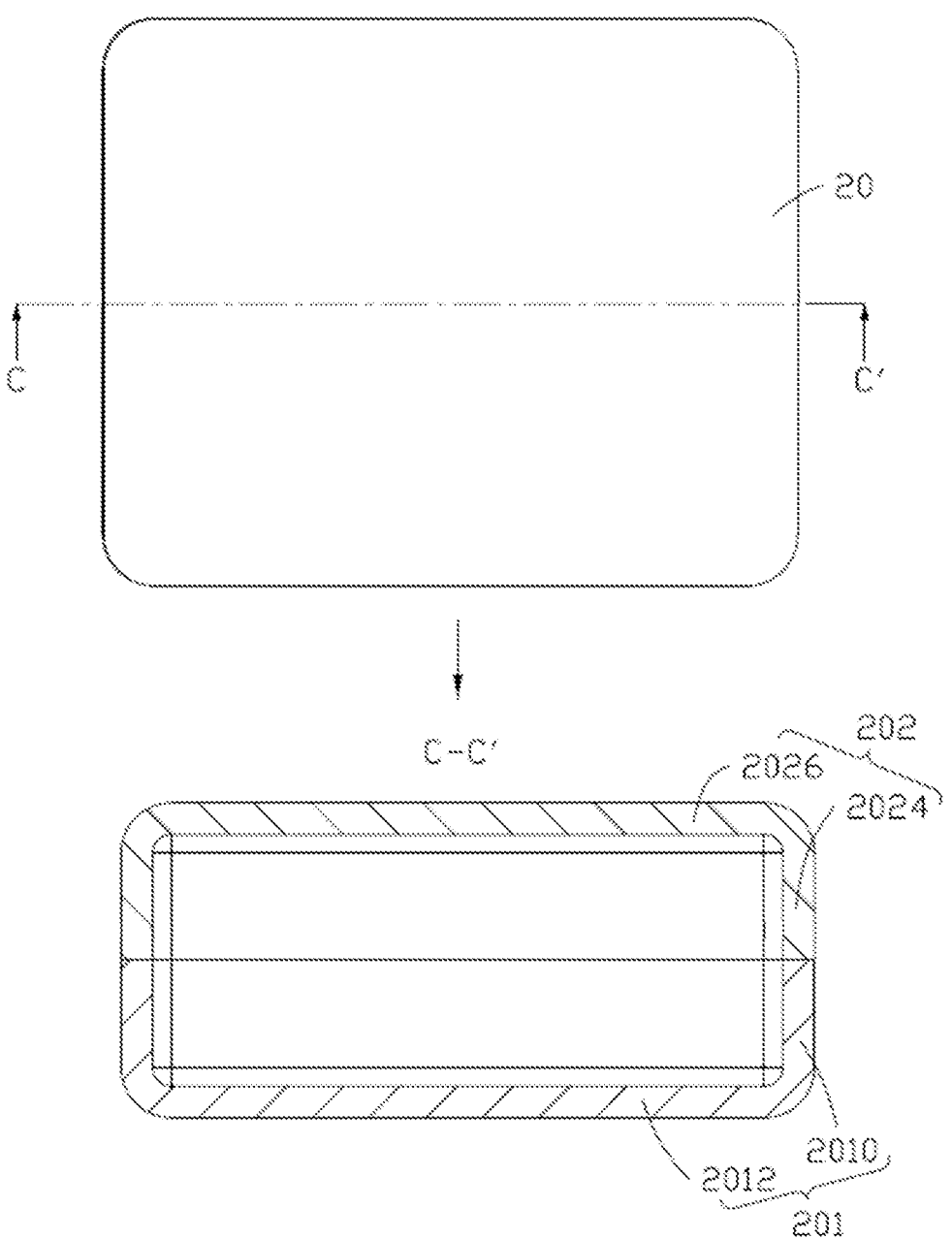
FIG. 6 is a schematic structural diagram of vertical connection between a first housing body and a second housing body according to another embodiment of this application.

As shown in FIG. 6, the housing 20 includes a first housing body 201 and a second housing body 202. The first housing body 201 and the second housing body 202 each include a sidewall and a bottom wall connected to the sidewall. Specifically, the first housing body 201 includes a first sidewall 2010 and a first bottom wall 2012 connected to the first sidewall 2010, and the second housing body 202 includes a second sidewall 2024 and a second bottom wall 2026 connected to the second sidewall 2024. The notch 220 is provided on the second housing body 202.

In some embodiments, when the first housing body 201 includes a sidewall, a first notch may be provided on the first housing body 201, and a second notch corresponding to the first notch may be provided on the second housing body 202. The first notch combines with the second notch to form the notch 220. A process of assembling the housing may be: fixing the second housing body 202 onto a workbench jig first, and then placing the first housing body 201 on the second housing body 202 in such a way that the first notch of the first housing body 201 is aligned with the second notch of the second housing body, and exerting an external pressure on the first housing body 201 so that the first housing body 201 fits the second housing body 202 closely;

and finally, connecting the first housing body 201 and the second housing body 202 to form a whole by gluing, heat sealing, welding, or one or more thereof.

Figure 7:
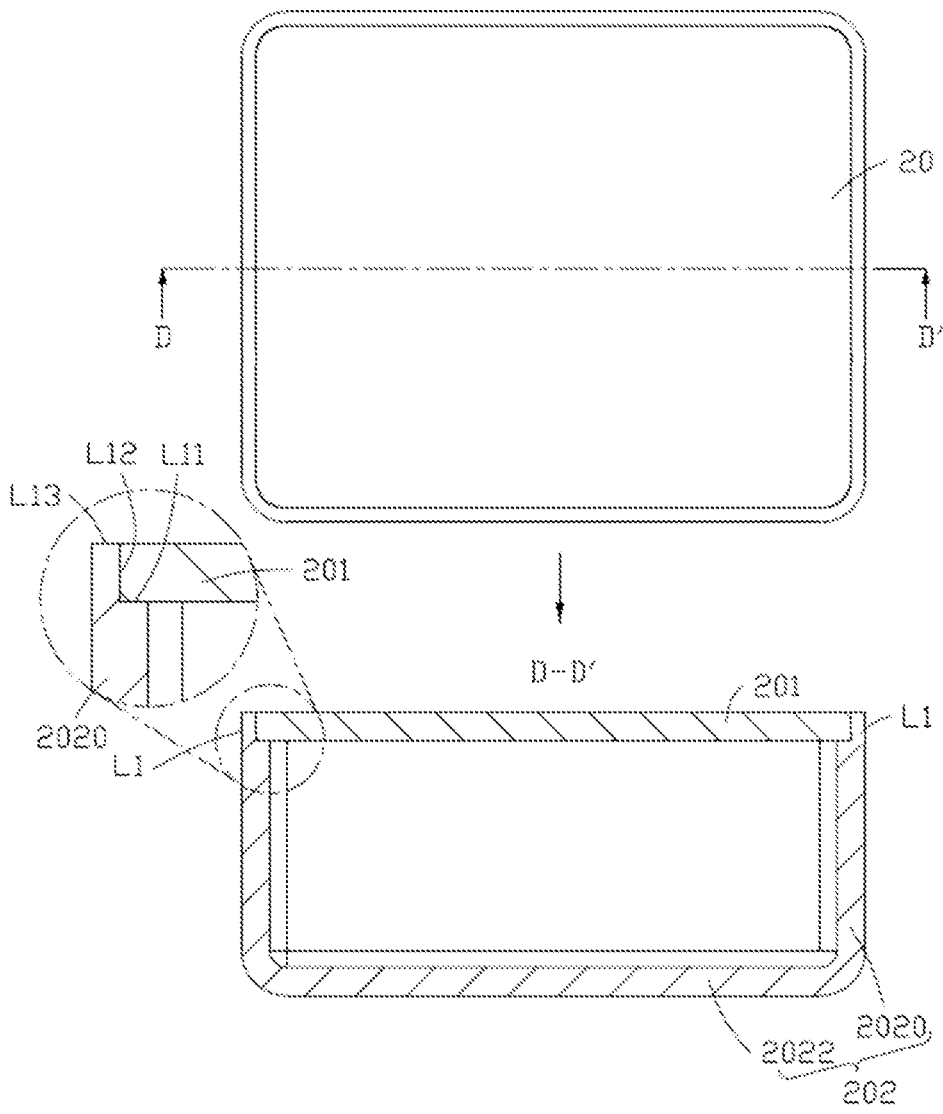
FIG. 7 is a schematic structural diagram of an L-shaped stepped portion disposed on a second housing body alone according to an embodiment of this application.

As shown in FIG. 7, the housing 20 includes a first housing body 201 and a second housing body 202. The first housing body 201 is a top cover of the housing 20, and the second housing body 202 includes a sidewall 2020 and a bottom wall 2022 connected to the sidewall 2020. The first housing body 201 and the second housing body 202 are connected in a vertical direction. An L-shaped stepped portion L1 is disposed on the sidewall 2020 of the second housing body 202. The L-shaped stepped portion L1 is configured to hold the first housing body 20.

In some embodiments, the L-shaped stepped portion L1 may include a first horizontal portion L11, a first vertical portion L12, and a second horizontal portion L13. The L-shaped stepped portion L1 formed by the first horizontal portion L11, the first vertical portion L12, and the second horizontal portion L13 is in a one-step shape.

Figure 8:
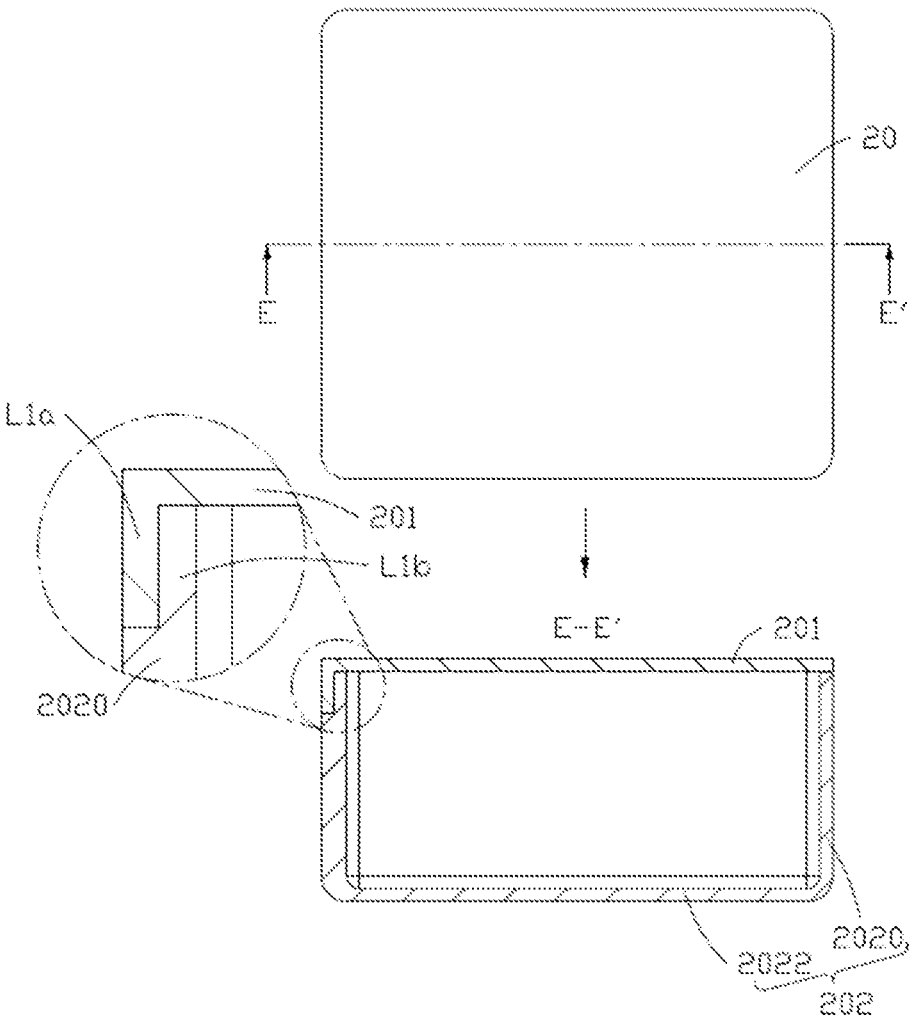
FIG. 8 is a schematic structural diagram of an L-shaped stepped portion disposed on both a first housing body and a second housing body according to an embodiment of this application.

As shown in FIG. 8, the housing 20 includes a first housing body 201 and a second housing body 202. The second housing body 202 includes a sidewall 2020 and a bottom wall 2022 connected to the sidewall 2020. The first housing body 201 and the second housing body 202 are connected in a vertical direction. A first L-shaped stepped portion L1*a* is disposed on the first housing body 201, and a second L-shaped stepped portion L1*b* corresponding to the first L-shaped stepped portion L1*a* is disposed on the second housing body 202. The first L-shaped stepped portion L1*a* and the second L-shaped stepped portion L1*b* are connected by a mortise-and-tenon joint.

In some embodiments, the number of steps of the first L-shaped stepped portion L1*a* is optionally the same as the number of steps of the second L-shaped stepped portion L1*b*. The first L-shaped stepped portion L1*a* and the second L-shaped stepped portion L1*b* may be in a one-step shape, or may be in a two-step or multi-step shape.

In other embodiments, the shapes of the stepped portions L1, L1*a*, and L1*b* are not limited to the L shape, and may be other stepped shapes.

Figure 9:
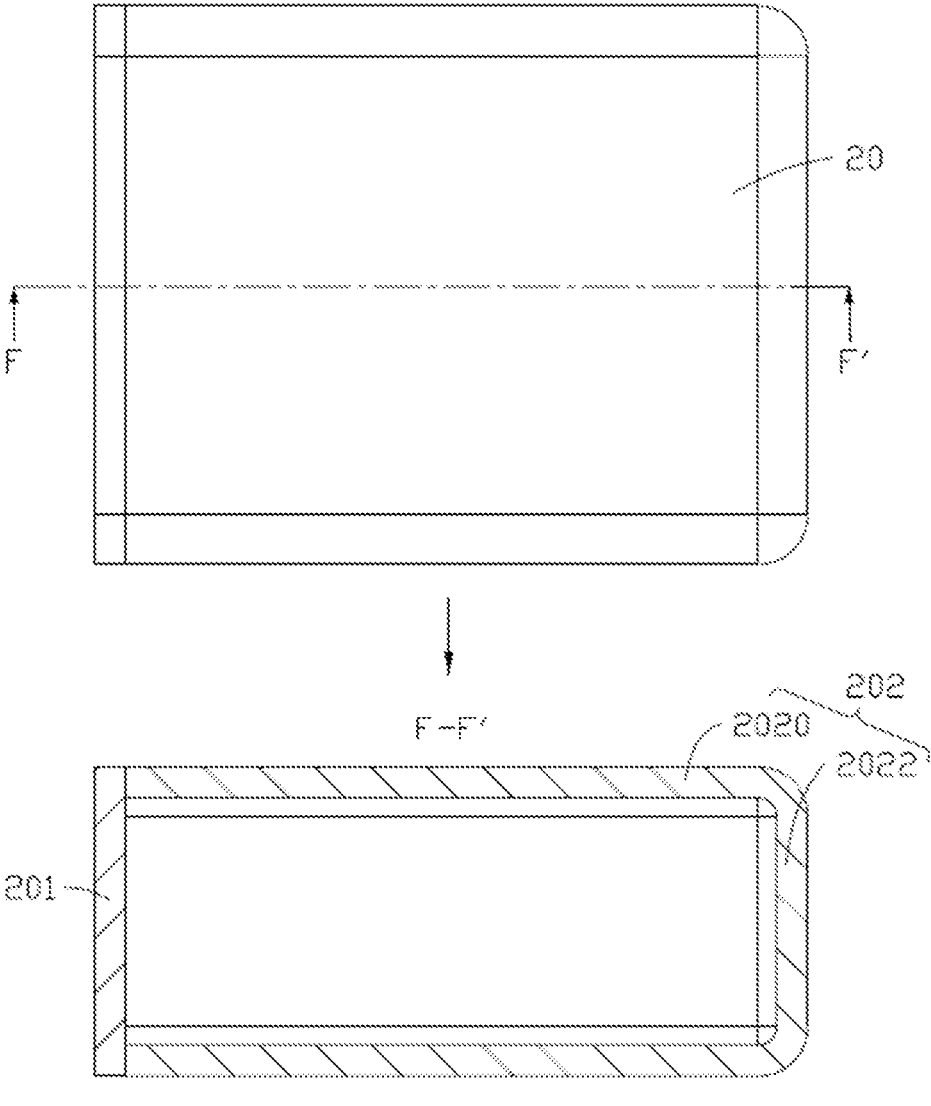
FIG. 9 is a schematic structural diagram of horizontal connection between a first housing body and a second housing body according to an embodiment of this application.

The housing 20 shown in FIG. 9 is structurally the same as the housing 20 shown in FIG. 5 except that the first housing body 201 and the second housing body 202 are connected in a horizontal direction, details of which are omitted herein.

Figure 10:
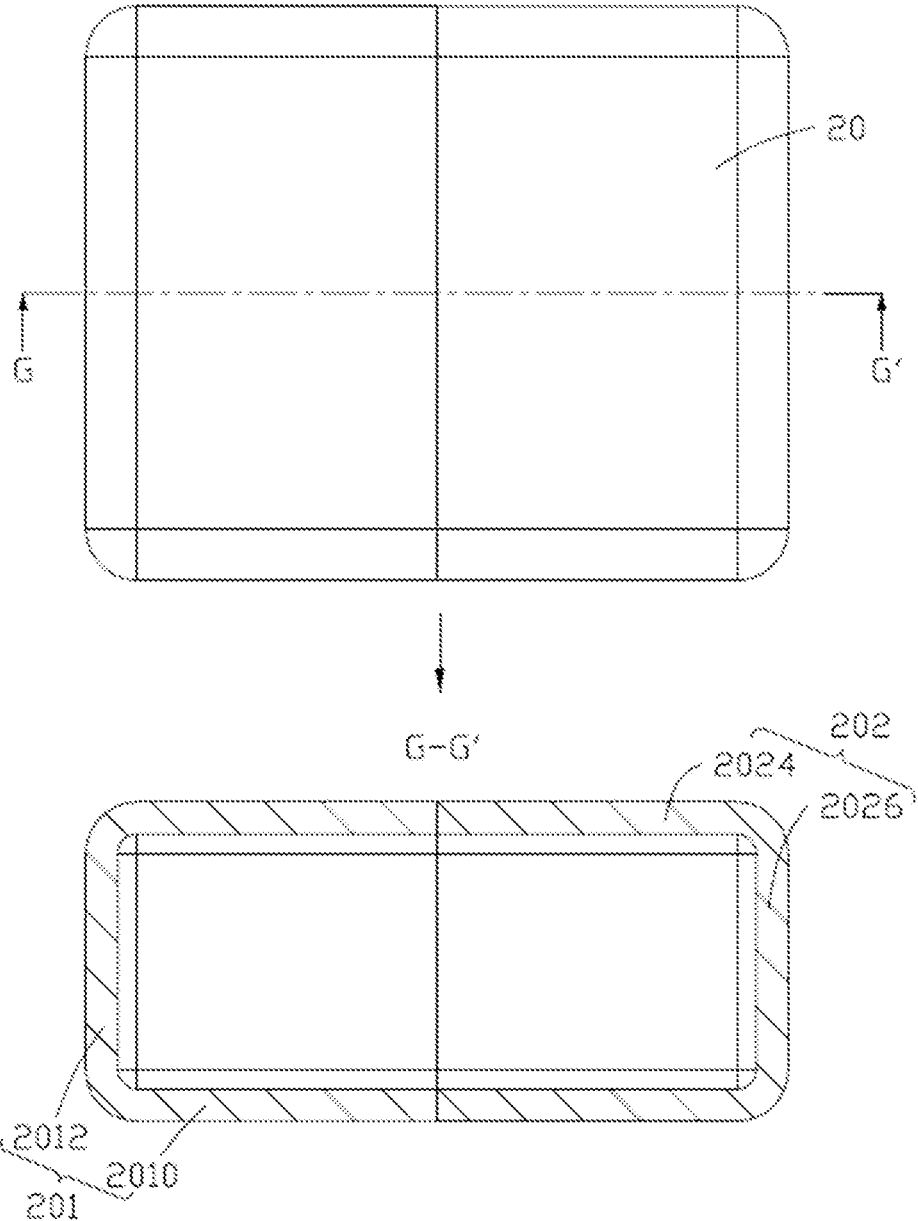
FIG. 10 is a schematic structural diagram of horizontal connection between a first housing body and a second housing body according to another embodiment of this application.

The housing 20 shown in FIG. 10 is structurally the same as the housing 20 shown in FIG. 6 except that the first housing body 201 and the second housing body 202 are connected in a horizontal direction, details of which are omitted herein.

Figure 11:
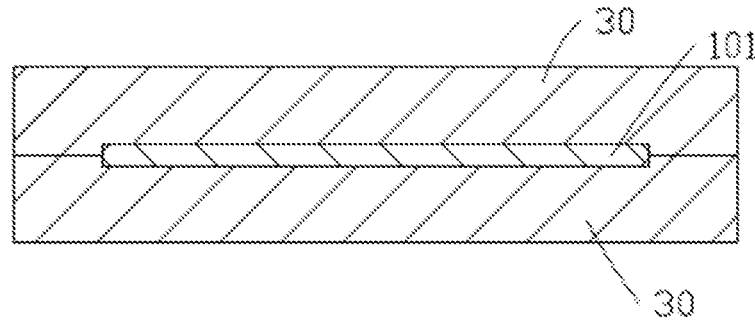
FIG. 11 is a schematic structural diagram of a structure formed by a sealing material and a positive tab according to an embodiment of this application.

As shown in FIG. 11, in an example in which the notch 220 contains only the positive tab 101, the sealing material 30 may form a structure on the positive tab 101 beforehand by any process such as gluing, hot melting, welding, or injection molding, and then the structure is placed in the notch 220. During assembling of the housing, the structure is compressed tightly and deformed. The compressed sealing material 30 may fully fill the notch 220, thereby isolating the cavity of the housing 20 from the outer surface of the housing 20.

Figure 12:
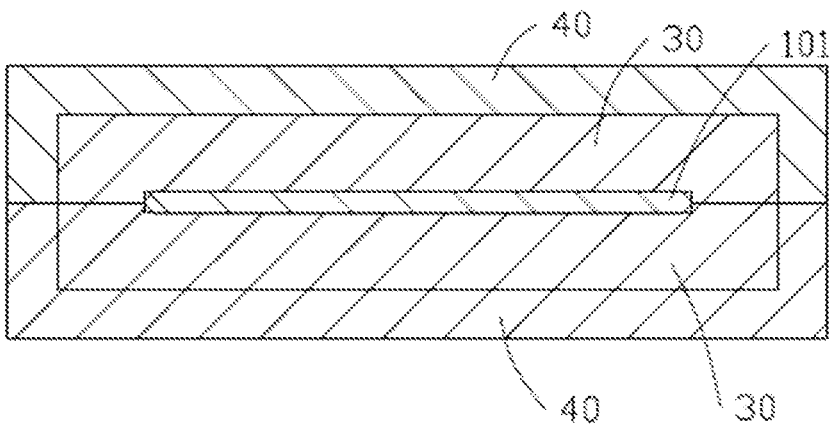
FIG. 12 is a schematic structural diagram of a structure formed by a sealing material, a high-temperature protection material, and a positive tab according to an embodiment of this application.

As shown in FIG. 12, the melting point of the sealing material is generally 150° C. In order to prevent the welding heat from causing damage to the sealing material 30 in a process of welding and assembling the first housing body 201 and the second housing body 202 to form the housing 20, a structure formed of the sealing material 30 and a high-temperature protection material 40 may be provided on the positive tab 101 beforehand. The layer of high-temperature protection material 40 that overlays the outer surface of the sealing material 30 can prevent the welding heat from damaging the sealing material 30. In assembling the housing, the structure is tightly compressed and deformed. The compressed sealing material 30 may fill the notch 220. The wall of the notch 220 and the sealing material 30 are interspaced with the high-temperature protection material 40 to prevent the welding heat from damaging the sealing material 30. The welding temperature is nearly 300° C. in the process of welding and assembling the first housing body 201 and the second housing body 202 to form the housing 20. Therefore, the melting point of the high-temperature protection material 40 is optionally greater than or equal to 300° C.

In some embodiments, the high-temperature protection material 40 may be any one selected from a steel alloy, an aluminum alloy, an iron alloy, a copper alloy, a liquid crystal polymer, p-hydroxybenzaldehyde, polyethylene terephthalate, polyvinyl chloride, polyimide, poly(acrylonitrile-co-butadiene-co-styrene), polycarbonate, polyamide, and polystyrene.

In some embodiments, the positive tab 101, the sealing material 30, and the high-temperature protection material 40 may form a structure that includes m layers. The order in which different layers of materials are combined may be determined according to actual needs. However, the outermost layer of the structure needs to be the high-temperature protection material 40, and m is optionally a positive integer greater than or equal to 3 and less than or equal to 10. For example, the structure formed by the positive tab 101, the sealing material 30, and the high-temperature protection material 40 includes 3 layers. The first layer is the positive tab 101, the second layer is the sealing material 30, and the third layer is the high-temperature protection material 40. Alternatively, the structure formed by the positive tab 101, the sealing material 30, and the high-temperature protection material 40 includes 5 layers. The first layer is the positive tab 101, the second layer is the sealing material 30, the third layer is the high-temperature protection material 40, the fourth layer is the sealing material 30, and the fifth layer is the high-temperature protection material 40.

Figure 13:
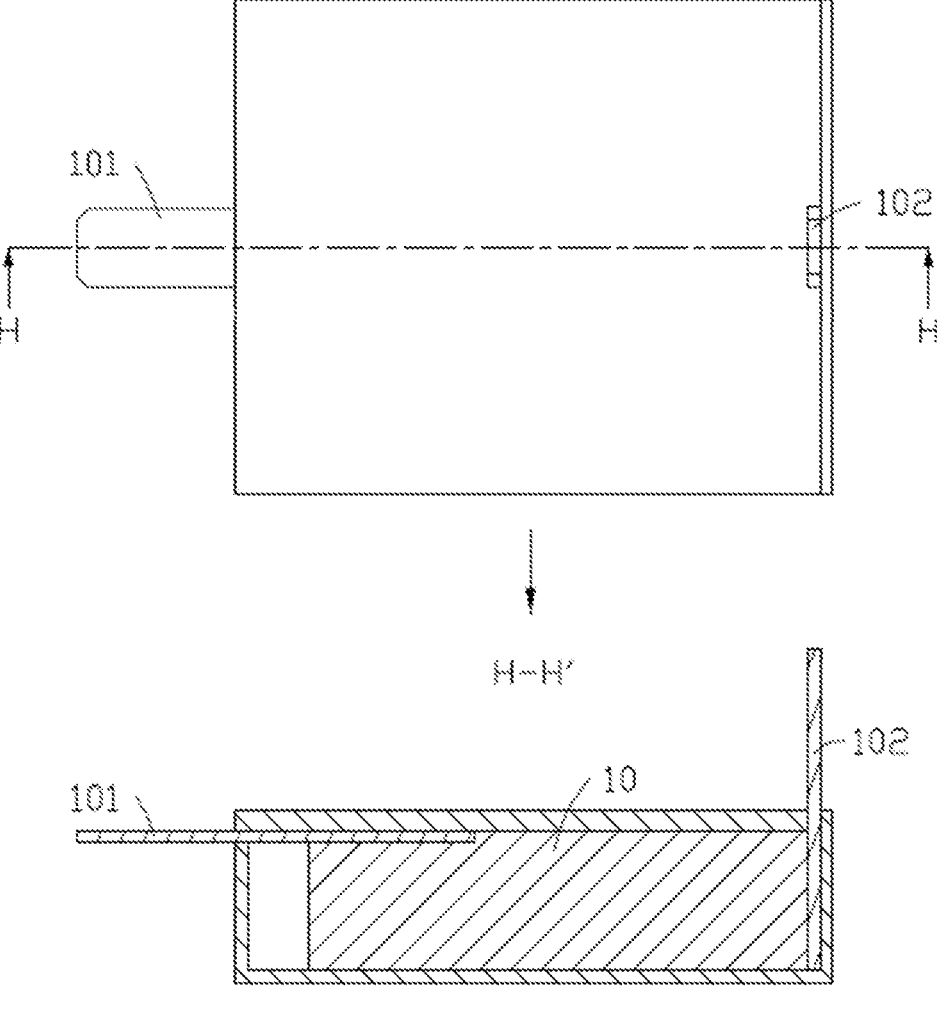
FIG. 13 is a schematic structural diagram of a positive tab and a negative tab that protrude from different sides of a housing according to an embodiment of this application.
Figure 14:
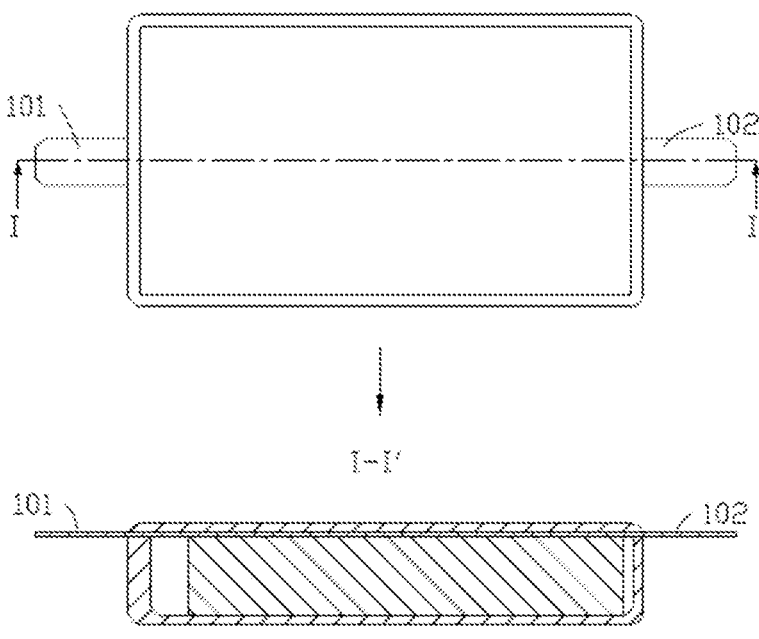
FIG. 14 is a schematic structural diagram of a positive tab and a negative tab that protrude from a same side of a housing according to an embodiment of this application.

As shown in FIG. 13 and FIG. 14, when the positive tab 101 and the negative tab 102 do not share a notch 220, the positive tab 101 and the negative tab 102 may protrude from different sides of the housing 20.

As shown in FIG. 1, in some embodiments, when the positive tab 101 and the negative tab 102 do not share a notch 220, the positive tab 101 and the negative tab 102 may protrude from the same side of the housing 20.

Figure 15:
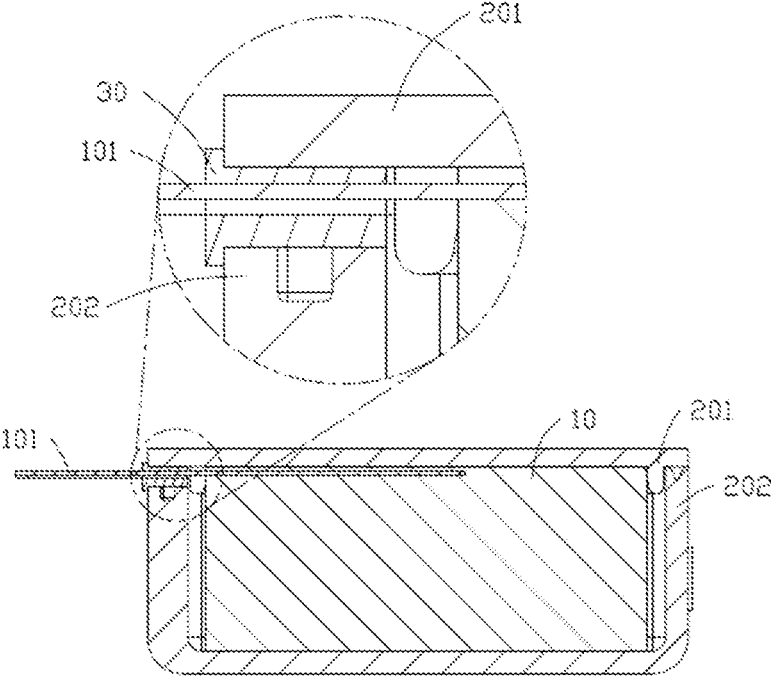
FIG. 15 is a schematic structural diagram of a notch filled with a binder according to an embodiment of this application.

As shown in FIG. 15, the sealing material 30 is a binder. A process of assembling the housing may be: fixing the second housing body 202 onto a workbench jig first, and then placing the first housing body 201 on the second housing body 202, and exerting an external pressure on the first housing body 201 so that the first housing body 201 fits the second housing body 202 closely; and subsequently, connecting the first housing body 201 and the second housing body 202 to form a whole by gluing, heat sealing, welding, or one or more thereof. The binder may fill the notch 220 and the region around the notch and outside the housing 20, thereby isolating the cavity of the housing 20 from the outer surface of the housing 20 and ensuring electrochemical stability of the electrode assembly 10 in the housing 20.

Figure 16:
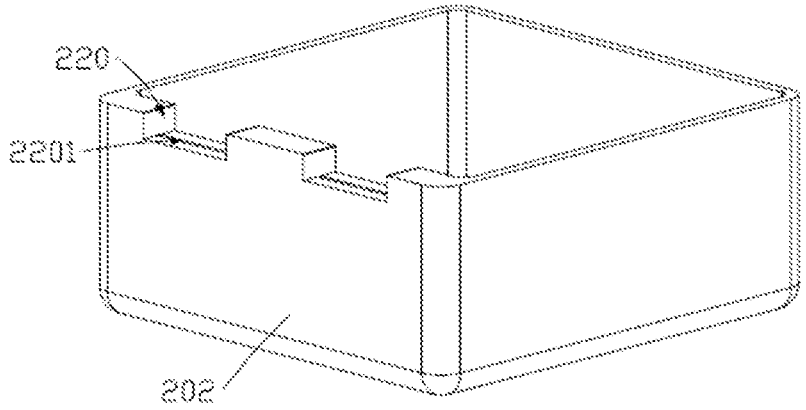
FIG. 16 is a schematic structural diagram of a dent disposed on a bottom wall of a notch according to an embodiment of this application.

As shown in FIG. 16, in order to improve the sealing reliability of the sealing material 30, a dent 2201 is disposed on the bottom wall of the notch 220, and a boss corresponding to the dent 2201 may be disposed on the sealing material 30. Through the snap-fit between the boss and dent 2201, the sealing material 30 and the notch 220 form a limiting structure, so that the sealing material 30 is firmly fixed in the notch 220.

Figure 17:
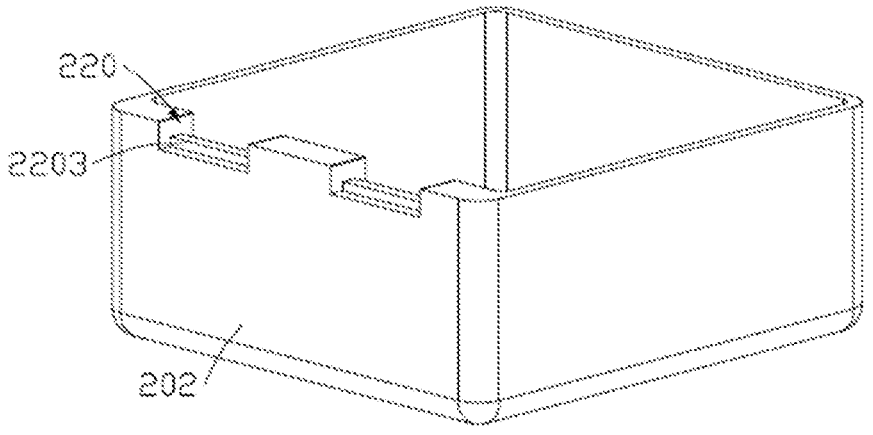
FIG. 17 is a schematic structural diagram of a boss disposed on a bottom wall of a notch according to an embodiment of this application.

As shown in FIG. 17, in order to improve the sealing reliability of the sealing material 30, a boss 2203 may be disposed on the bottom wall of the notch 220, and a dent corresponding to the boss 2203 may be disposed on the sealing material 30. Through the snap-fit between the boss 2203 and dent, the sealing material 30 forms a limiting structure, so that the sealing material 30 is firmly fixed in the notch 220.

Figure 18:
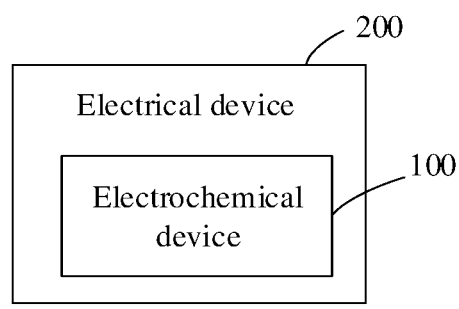
FIG. 18 is a schematic modular diagram of an electrical device according to an embodiment of this application.

In addition, as shown in FIG. 18, this application further discloses an electrical device 200. The electrical device 200 includes the electrochemical device 100 that falls in any one of the circumstances above. The electrical device 200 may be an electric motorcycle, an electric bicycle, an electric tool, an electric vehicle, an unmanned aerial vehicle, a mobile phone, a tablet computer, a personal digital assistant, a personal computer, or any other rechargeable device as appropriate.

Understandably, in the description of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of this application, but not intended to indicate or imply that the mentioned device or component must be located in the specified direction or constructed or operated in the specified direction. Therefore, such terms are not intended as a limitation on this application. In the description of this application, "a plurality of" means two or more.

In the description of this specification, reference to the terms "one embodiment", "some embodiments", "illustrative embodiment", "example", "specific example", "some examples", and the like means that a particular feature, structure, material, or characteristic described in connection with the embodiment or example is included in at least one embodiment or example of this application. In this embodiment, an illustrative expression of such terms do not necessarily refer to an identical embodiment or example. In addition, the particular features, structures, materials, or characteristics may be combined in one or more embodiments in any appropriate manner.

Although some embodiments of this application are shown and described above, a person of ordinary skill in the art understands that variations, modifications, substitutions, and derivations may be made to said embodiments without departing from the principles and concept of this application. The scope of this application is subject to the claims and equivalents thereof

What is claimed is:

1. An electrochemical device, comprising an electrode assembly and a housing for accommodating the electrode assembly; wherein, the housing comprises a first housing body and a second housing body fixedly connected to the first housing body, the first housing body and the second housing body are made of a metal material and connected by welding, a notch is provided on at least one of the first housing body or the second housing body, the electrode assembly comprises a tab, the tab protrudes out of the housing from the notch, and the notch is filled with a sealing material;

wherein a boss is disposed on one wall of the notch or the sealing material, a dent is disposed on an other wall of the notch or the sealing material, and the boss is snap-fitted to the dent.

2. The electrochemical device according to claim 1, wherein the sealing material is an elastic sealing material or a binder.

3. The electrochemical device according to claim 2, wherein the sealing material is the binder; and the binder comprises any one of polypropylene hot-melt adhesive, phenolic resin adhesive, or epoxy adhesive.

4. The electrochemical device according to claim 2, wherein the sealing material is the elastic sealing material; and the elastic sealing material comprises any one of polypropylene, polycarbonate, polyamide, polystyrene, fluororubber, or soluble polytetrafluoroethylene.

5. The electrochemical device according to claim 1, wherein the notch is provided only on the second housing body.

6. The electrochemical device according to claim 5, wherein the first housing body is a top cover of the housing, and the second housing body comprises a sidewall and a bottom wall connected to the sidewall.

7. The electrochemical device according to claim 6, wherein a stepped portion is disposed on the sidewall, and the stepped portion is configured to hold the top cover.

8. The electrochemical device according to claim 6, wherein a first stepped portion is disposed on the sidewall, a second stepped portion corresponding to the first stepped portion is disposed on the top cover, and the first housing body is connected to the second housing body by the first stepped portion and the second stepped portion to form the housing.

9. The electrochemical device according to claim 1, wherein a first notch is provided on the first housing body, a second notch corresponding to the first notch is provided on the second housing body; and the first notch and the second notch together form the notch.

10. The electrochemical device according to claim 9, wherein the first housing body comprises a first sidewall and a first bottom wall connected to the first sidewall, and the second housing body comprises a second sidewall and a second bottom wall connected to the second sidewall.

11. The electrochemical device according to claim 10, wherein a first stepped portion is disposed on the first sidewall, a second stepped portion corresponding to the first stepped portion is disposed on the second sidewall, and the first housing body is connected to the second housing body by the first stepped portion and the second stepped portion to form the housing.

12. The electrochemical device according to claim 1, wherein the housing further comprises a third housing body, the first housing body is a top cover of the housing, the second housing body is a sidewall of the housing, the third housing body is a bottom cover of the housing; wherein the first housing body, the second housing body, and the third housing body are sequentially connected to form the housing.

13. The electrochemical device according to claim 1, wherein a wall of the notch and the sealing material are interspaced with a high-temperature protection material; wherein the tab, the sealing material, and the high-temperature protection material form an m-layer structure in the notch; wherein an outermost layer of the structure is made of the high-temperature protection material, and m is a positive integer greater than or equal to 3 and less than or equal to 10.

14. The electrochemical device according to claim 13, wherein a melting point of the high-temperature protection material is greater than or equal to 300° C.

15. The electrochemical device according to claim 13, wherein the high-temperature protection material comprises any one of a steel alloy, an aluminum alloy, an iron alloy, a copper alloy, a liquid crystal polymer, p-hydroxybenzaldehyde, polyethylene terephthalate, polyvinyl chloride, polyimide, poly(acrylonitrile-co-butadiene-co-styrene), polycarbonate, polyamide, or polystyrene.

16. The electrochemical device according to claim 1, wherein the first housing body and the second housing body are fixedly connected in a vertical direction or a horizontal direction.

17. The electrochemical device according to claim 1, wherein both the first housing body and the second housing body are made of a material comprising one of a steel alloy, an aluminum alloy, an iron alloy, or a copper alloy.

18. The electrochemical device according to claim 1, wherein the electrode assembly comprises two tabs, and the two tabs protrude out of the housing from the notch.

19. The electrochemical device according to claim 1, wherein, the electrode assembly comprises a positive electrode plate, a negative electrode plate, a separator, and two tabs; the separator is disposed between the positive electrode plate and the negative electrode plate; and the two tabs are electrically connected to a positive current collector of the positive electrode plate and a negative current collector of the negative electrode plate respectively.

20. The electrochemical device according to claim 19, wherein the two tabs protrude from a same side of the housing, or the two tabs protrude from different sides of the housing.

21. The electrochemical device according to claim 1, wherein the notch is in a rectangular shape.

22. An electrical device, comprising an electrochemical device comprising an electrode assembly and a housing for accommodating the electrode assembly; wherein, the housing comprises a first housing body and a second housing body fixedly connected to the first housing body, the first housing body and the second housing body are made of a metal material and connected by welding, a notch is provided on at least one of the first housing body or the second housing body, the electrode assembly comprises a tab, the tab protrudes out of the housing from the notch, and the notch is filled with a sealing material;

wherein a boss is disposed on one wall of the notch or the sealing material, a dent is disposed on an other wall of the notch or the sealing material, and the boss is snap-fitted to the dent.

* * * * *